United States Patent
Mathew et al.

(10) Patent No.: US 9,733,686 B1
(45) Date of Patent: Aug. 15, 2017

(54) SYSTEMS AND METHODS FOR MANAGEMENT CONTROLLER ENHANCED POWER SUPPLY UNIT CURRENT SHARING

(71) Applicant: Dell Products L.P., Round Rock, TX (US)

(72) Inventors: Abey K. Mathew, Georgetown, TX (US); Padmanabh R. Gharpure, Round Rock, TX (US); Stuart Allen Berke, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/014,766

(22) Filed: Feb. 3, 2016

(51) Int. Cl.
  *G06F 1/26* (2006.01)
  *G06F 13/362* (2006.01)

(52) U.S. Cl.
  CPC ............ *G06F 1/266* (2013.01); *G06F 13/362* (2013.01)

(58) Field of Classification Search
  CPC ................................. G06F 1/266; G06F 13/362
  See application file for complete search history.

(56) References Cited

U.S. PATENT DOCUMENTS

| | | | |
|---|---|---|---|
| 6,493,243 B1* | 12/2002 | Real ......................... | H02J 9/062 307/66 |
| 7,541,793 B2 | 6/2009 | Saeueng et al. | |
| 8,120,204 B2 | 2/2012 | Moon et al. | |
| 8,400,795 B2* | 3/2013 | Blackwell ................. | H02J 1/10 363/65 |
| 8,513,831 B2 | 8/2013 | Bushue et al. | |
| 2010/0013306 A1* | 1/2010 | Heineman ................. | H02J 1/08 307/32 |
| 2013/0140888 A1* | 6/2013 | Edwards ................... | H02J 1/10 307/20 |
| 2014/0159497 A1* | 6/2014 | Chen ......................... | G06F 1/28 307/82 |
| 2016/0105057 A1* | 4/2016 | Shih ........................... | H02M 1/4258 307/65 |

OTHER PUBLICATIONS

Mazumder, Sudip K. et al., Master-Slave Current-Sharing Control of a Parallel DC-DC Converter System Over an RF Communication Interface, IEEE Transactions on Industrial Electronics. vol. 55, No. 1, Jan. 2008, pp. 59-66.

* cited by examiner

*Primary Examiner* — Mark Connolly
(74) *Attorney, Agent, or Firm* — Jackson Walker L.L.P.

(57) ABSTRACT

A method may include, when a management controller is able to control a plurality of power supply units (PSUs): selecting a PSU of the plurality of PSUs as a master of a current share bus; driving, by the PSU selected as the master, a current share signal on the current share bus; and monitoring, by PSUs other than the power supply unit selected as the master, the current share signal. The method may also include, when the management controller is unable to control the plurality of PSUs: attempting, by each of the plurality of PSUs, to drive the current share signal on the current share bus; and monitoring, by each of the PSUs, the current share signal. Each of the PSUs may output current to the power bus in accordance with the current share signal.

27 Claims, 6 Drawing Sheets

US 9,733,686 B1

SYSTEMS AND METHODS FOR MANAGEMENT CONTROLLER ENHANCED POWER SUPPLY UNIT CURRENT SHARING

TECHNICAL FIELD

The present disclosure relates in general to information handling systems, and more particularly to systems and methods for current sharing between power supply units in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include one or more power supply units for providing electrical energy to components of the information handling system. Typically, a power supply unit is configured to operate from an input alternating current (AC) source of electrical energy, which the power supply unit converts to a direct current (DC) output. Thus, typically a power supply unit may include a rectifier and/or power factor correction stage to receive the input AC source and rectify the input AC waveform to charge a bulk capacitor to a desired voltage. A direct-current-to-direct-current (DC-DC) stage may convert the voltage on the bulk capacitor to a DC output voltage which may be used to power components of the information handling system.

When two or more power supply units operate in parallel to meet power requirements of an information handling system, it is often desirable to maintain a current balance among the power supply units within acceptable tolerances to prevent one of such power supply units from taking up a disproportionate share of the current load, which could cause a power supply unit to reach over-current limits, over-voltage limits, oscillations on a power bus, and/or other negative effects.

SUMMARY

In accordance with the teachings of the present disclosure, the disadvantages and problems associated with existing approaches to current sharing among power supply units may be reduced or eliminated.

In accordance with embodiments of the present disclosure, an information handling system may include a processor, a management controller communicatively coupled to the processor, and a plurality of power supply units communicatively coupled to the management controller for supplying electrical energy to one or more information handling resources of the information handling system via a power bus. Each of the plurality of power supply units may be configured to, when the management controller is able to control the plurality of power supply units: (i) receive an indication from the management controller whether such power supply unit is selected as a master of a current share bus; (ii) if such power supply unit is selected as the master, drive a current share signal on the current share bus, the current share signal indicative of an output current driven by such power supply unit on the power bus; and (iii) if such power supply unit is not selected as the master, monitor the current share signal and drive the output current to the power bus in accordance with the current share signal. Each of the plurality of power supply units may be also be configured to, when the management controller is unable to control the plurality of power supply units: (i) attempt to drive the current share signal on the current share bus; and (ii) monitor the current share signal and drive the output current to the power bus in accordance with the current share signal.

In accordance with these and other embodiments of the present disclosure, a power supply unit may include a power train and a controller communicatively coupled to the power train and configured to receive an indication whether a management controller is able to control the power supply unit. When the indication indicates the management controller is able to control the power supply unit, the controller may further be configured to: (i) receive an indication from the management controller whether the power supply unit is selected as a master of a current share bus; (ii) if the power supply unit is selected as the master, drive a current share signal on the current share bus, the current share signal indicative of an output current driven by the power train on a power bus; and (iii) if the power supply unit is not selected as the master, monitor the current share signal and drive the output current to the power bus in accordance with the current share signal. When the indication indicates that the management controller is unable to control the power supply unit, the controller may further be configured to: (i) attempt to drive the current share signal on the current share bus; and (ii) monitor the current share signal and drive the output current to the power bus in accordance with the current share signal.

In accordance with these and other embodiments of the present disclosure, a method may include determining whether a management controller is able to control a plurality of power supply units. The method may also include, when the management controller is able to control the plurality of power supply units: (i) selecting a power supply unit of the plurality of power supply units as a master of a current share bus; (ii) driving, by the power supply unit selected as the master, a current share signal on the current share bus, the current share signal indicative of an output current driven by the power supply unit selected as the master; and (iii) monitoring, by power supply units other than the power supply unit selected as the master, the current share signal and driving, by power supply units other than the power supply unit selected as the master, respective output currents to the power bus in accordance with the current share signal. The method may also include, when the management controller is unable to control the plurality of power supply units: (i) attempting, by each of the plurality of power supply units, to drive the current share signal on the current share bus; and (ii) monitoring, by each of the power supply units, the current share signal and driving, by each of the power supply units, the output current to the power bus in accordance with the current share signal.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1A through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 1A:
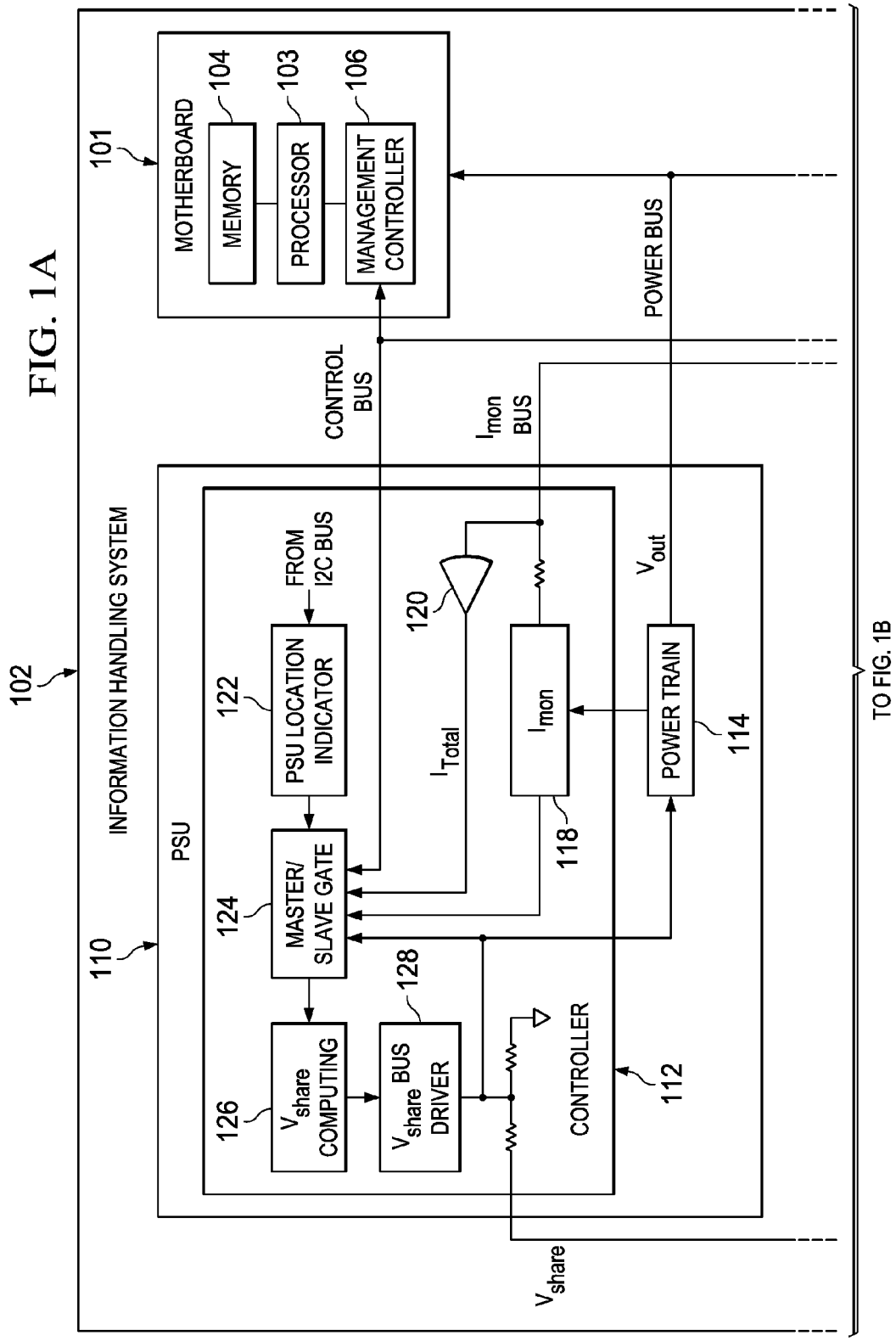
FIGS. 1A-1C illustrates a block diagram of an example information handling system, in accordance with embodiments of the present disclosure.
Figure 1B:
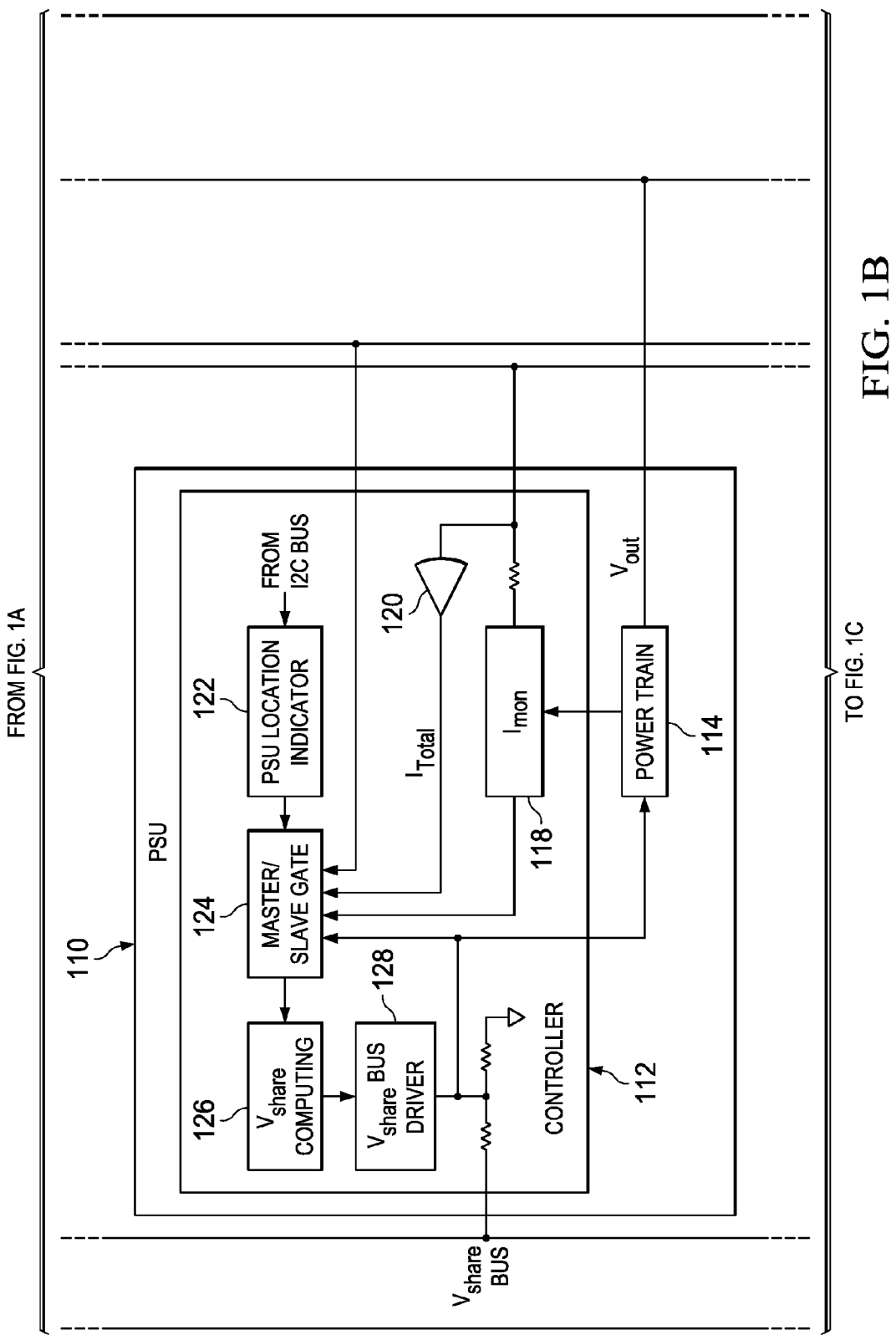
Figure 1C:
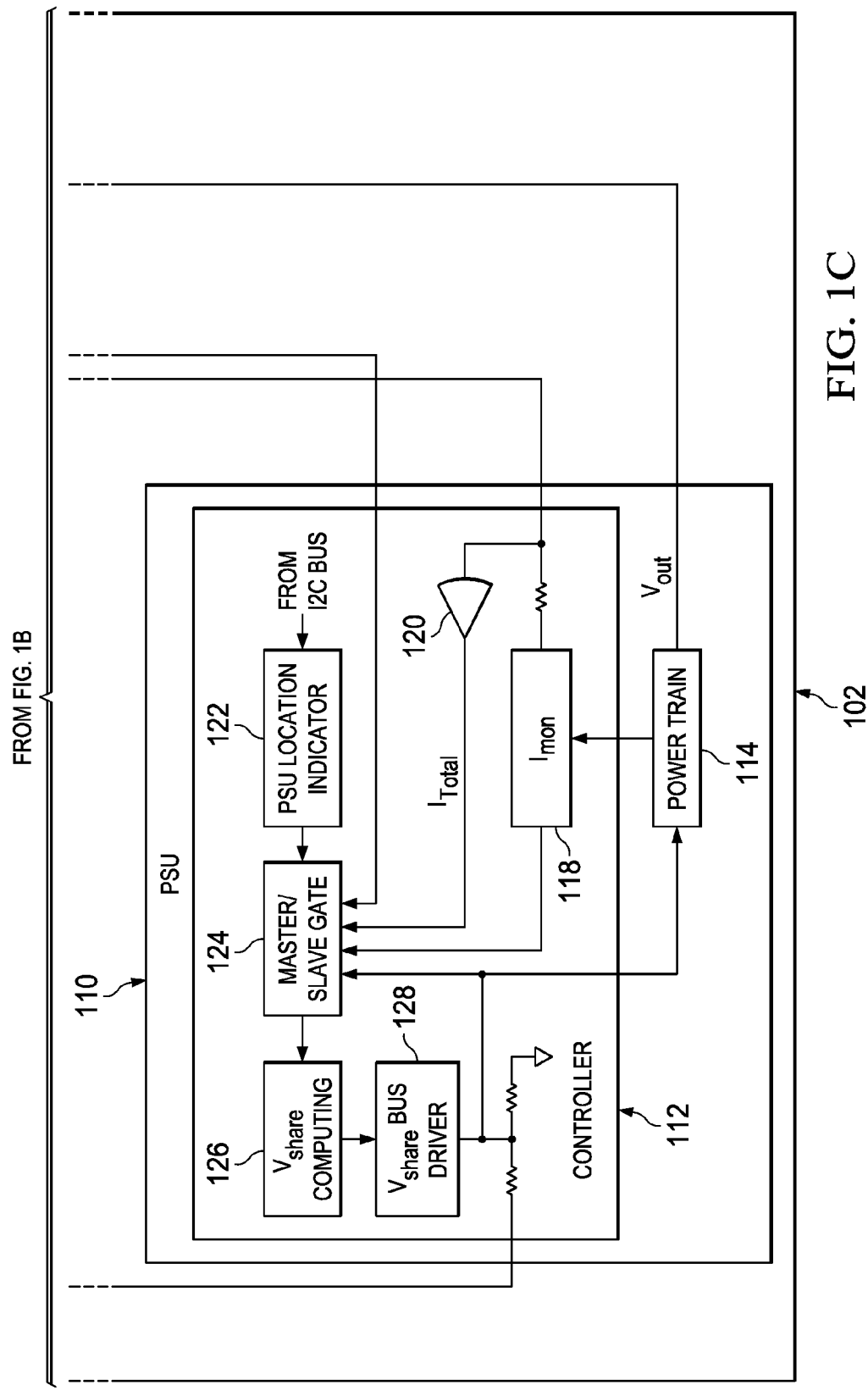

FIGS. 1A-1C (which may collectively be referred to herein as "FIG. 1") illustrate a block diagram of an example of an information handling system 102. As depicted, information handling system 102 may include one or more power supply units (PSUs) 110, a motherboard 101, and one or more other information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, a memory 104, a management controller 106, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. In particular embodiments, memory 104 may comprise a non-volatile memory comprising one or more non-volatile dual-inline memory modules (NVDIMMs).

Management controller 106 may be configured to provide out-of-band management facilities for management of information handling system 102. Such management may be made by management controller 106 even if a host system of information handling system 102 is powered off or powered to a standby state. Management controller 106 may include a processor, memory, an out-of-band network interface separate from and physically isolated from an in-band network interface of information handling system 102, and/ or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, management controller 106 may be configured to communicate with PSUs 110 to control which PSUs 110 are enabled to operate as a master (as opposed to a slave) of a current share bus and/or which PSU 110 is set as a dedicated master of the current share bus, as described in greater detail below.

Generally speaking, a PSU 110 may include any system, device, or apparatus configured to supply electrical current to one or more information handling resources of information handling system 102. As shown in FIG. 1, a PSU 110 may include a controller 112 and a power train 114. Each power train 114 may be coupled at its outputs to a power bus configured to deliver electrical energy to motherboard 101 and other components of information handling system 102.

Controller 112 may comprise a microprocessor, DSP, ASIC, FPGA, EEPROM, or any combination thereof, or any other device, system, or apparatus for controlling operation of PSU 110. As such, controller 112 may comprise firmware, logic, and/or data for controlling functionality of PSU 110. As shown in FIG. 1, controller 112 may couple to a current share bus (as labeled with "$V_{share}$ BUS" in FIG. 1) with PSUs 110 in order to establish a current share for the various currents delivered to the power bus by PSUs 110. As shown in FIG. 1, each controller 112 may comprise a current monitor 118, a current aggregator 120, a PSU location indicator 122, a master/slave gate 124, a current share bus voltage computation block 126, and a current share bus driver 128.

Each current monitor 118 may comprise any suitable system, device, or apparatus for sensing a current delivered by a power train 114 of a PSU 110 to the power bus and generating a signal $I_{mon}$ indicative of such current. For example, in some embodiments, such current monitor 118 may include a resistor which generates a voltage indicative of the current, in accordance with Ohm's law.

Each current aggregator 120 may comprise any suitable system, device, or apparatus for sensing an aggregate current delivered by all PSUs 110 of information handling system 102 and generating a signal $I_{Total}$ indicative of such aggregate current. For example, in some embodiments, such current aggregator 120 may include a resistor which generates a voltage indicative of the aggregate current, in accordance with Ohm's law.

A PSU location indicator 122 may comprise any suitable system, device, or apparatus for determining, out of a plurality of multiple PSU bays in information handling system 102, in which PSU bay a PSU 110 is located. In some embodiments, such determination may be made based on information communicated from an Inter-Integrated Circuit (I2C) bus or other communications bus of information handling system 102.

A master/slave gate 124 may comprise any system, device, or apparatus configured to receive information regarding a voltage $V_{share}$ present on a current share bus, a monitored current $I_{mon}$ generated by a power train 114, an aggregate current $I_{Total}$ generated by PSUs 110, a location of a PSU 110, and/or control variable settings of PSU 110, and based on such received information, determine whether a PSU 110 is to drive a voltage on the current share bus.

Control variable settings may be set by management controller 106 when management controller 106 is active (e.g., via a bus labeled as "CONTROL BUS" in FIG. 1), or in the event that management controller 106 is not active or experiences a fault, may be set to default values of such control variable settings. In some embodiments, such control settings may include a dedicated master variable DED_MASTER and a current share bus drive variable DRIVE. In such embodiments, a current share bus drive variable DRIVE of a PSU 110 controls whether a PSU 110 drives the current share bus and dedicated master variable DED_MASTER controls whether a PSU 110 is set by management controller 106 to be a dedicated master of the current share bus. In some of such embodiments, dedicated master variable DED_MASTER may be implemented using a single bit (e.g., a value of logic "1" to set a PSU 110 to be the dedicated master of the current share bus and a value of logic "0" to indicate that the PSU 110 is not the dedicated master). In these and other embodiments, current share bus drive variable DRIVE may be implemented using a single bit (e.g., a value of logic "1" to cause PSU 110 to drive the current share bus and a value of logic "0" to disable a PSU 110 from driving the current share bus). To further illustrate control of a PSU 110 by control variable settings, the following truth table is provided:

| DED_MASTER | DRIVE | EFFECT |
| --- | --- | --- |
| 0 | 0 | PSU 110 acts as a slave with respect to current share bus; controls power train 114 based on voltage read from current share bus |
| 1 | 0 | PSU 110 acts as a slave with respect to current share bus; controls power train 114 based on voltage read from current share bus |
| 0 | 1 | PSU 110 drives current share bus and attempts to become master; if not master (e.g., if voltage driven to current share bus is not the highest of all voltages driven to current share bus), controls power train 114 based on voltage read from current share bus |
| 1 | 1 | PSU 110 is dedicated master and drives current share bus |

Each current share bus voltage computation block 126 may comprise any suitable system, device, or apparatus for computing, for a PSU 110 enabled to drive the current share bus (e.g., those PSUs 110 with a current share bus drive variable DRIVE of logic "1"), a voltage to be driven by the PSU 110 on the current share bus. For example, in some embodiments, such computation may be based on the aggregate current $I_{Total}$ and the number of active PSUs 110 (which may be estimated based on the aggregate current $I_{Total}$ and the monitored current $I_{mon}$ for the particular PSU 110). A signal indicative of such voltage to be driven may be communicated by current share bus voltage computation block 126 to a current share bus driver 128 of the PSU 110.

Each current share bus driver 128 may comprise any suitable system, device, or apparatus (e.g., electronic or electrical circuit) for driving a voltage on the current share bus based on a signal communicated to such current share bus driver 128 by its associated current share bus voltage computation block 126. In some embodiments, a current share bus driver 128 may include circuitry (e.g., an output diode), such that a current share bus driver 128 drives the current share bus only if such current share bus driver 128 is attempting to drive a voltage larger than that driven by the current share bus drivers 128 of other PSUs 110.

Power train 114 may include any suitable system, device, or apparatus for converting electrical energy received by PSU 110 (e.g., a 120-volt alternating current or 240-volt alternating current voltage waveform, a 48-volt DC or 240-volt DC or 380-volt DC direct current voltage waveform) from an input source into electrical energy usable to information handling resources of information handling system 102 (e.g., 12-volt direct current voltage source). In some embodiments, power train 114 may comprise a rectifier, a power factor correction circuit, and/or a direct-current-to-direct-current converter. In these and other embodiments, power train 114 may comprise a voltage regulator (e.g., a multi-phase voltage regulator). In some embodiments, one or more PSUs 110 may share an input source. In operation, a power train 114 may deliver an amount of electrical current to the power bus in accordance with a control signal communicated from controller 112 indicative of a desired amount of electrical current to be delivered. In some embodiments, such control signal may comprise the voltage $V_{share}$ present on the current share bus or a control signal indicative of the voltage $V_{share}$ present on the current share bus, such that the power train 114 is controlled by the voltage $V_{share}$ present on the current share bus.

In addition to motherboard 101, processor 103, memory 104, management controller 106, and PSUs 110, information handling system 102 may include one or more other information handling resources. For example, in some embodiments, information handling system 102 may include a number of PSUs 110 other than three.

Figure 2:
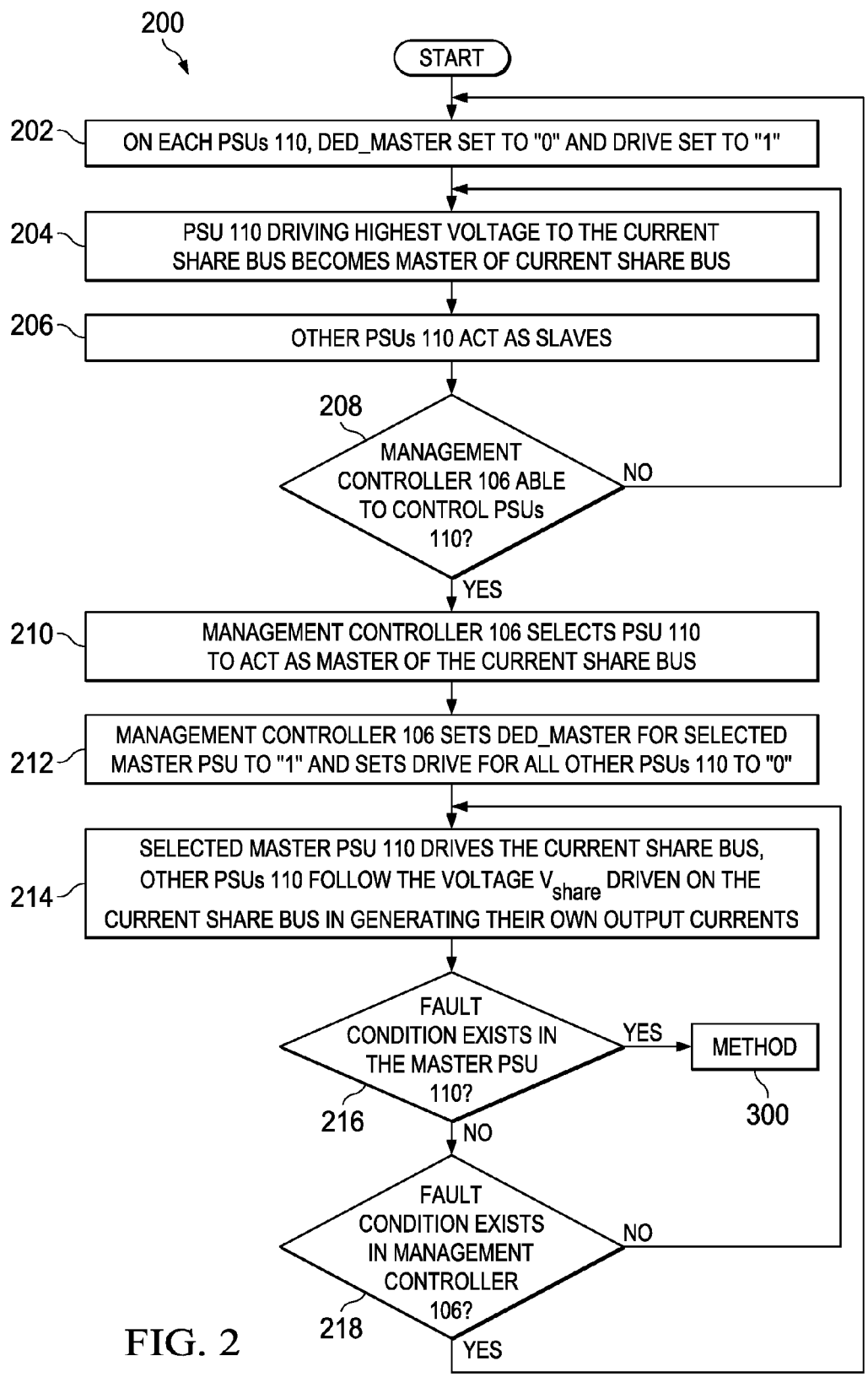
FIG. 2 illustrates a flow chart of an example method for current sharing in a normal mode of a power system, in accordance with embodiments of the present disclosure.

FIG. 2 illustrates a flow chart of an example method 200 for current sharing in a normal mode of a power system, in accordance with embodiments of the present disclosure. Such start-up mode may occur during an initial powering on of the power system comprising PSUs 110 during which management controller 106 may itself be initializing and not yet able to provide active control of PSUs 110. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, during start-up mode of the power system comprising PSUs 110 or if a fault exists in management controller 106, management controller 106 may not be able to set control variable settings for PSUs 110 and accordingly, such control variable settings may assume default values. For example, PSUs 110 may assume default values such that their respective dedicated master variables DED_MASTER are set to logic "0" and their respective current share bus drive variables DRIVE are set to logic "1." With such default settings, each PSU 110 may drive or attempt to drive the current share bus and may attempt to become a master of the current share bus.

At step 204, the PSU 110 driving the highest voltage to the current share bus may become the master of the current share bus. Accordingly, at step 206, all other PSUs 110 may act as slaves, and may attempt to "catch up" to the master by increasing their respective output currents.

At step 208, PSUs 110 may determine if management controller 106 has completed initialization such that it is able to control PSUs 110. Such determination may be made by reading information communicated from management controller 106 indicative of its status (e.g., by communicating appropriate signals over the control bus indicated in FIG. 1). If management controller 106 is able to control PSUs 110, method 200 may proceed to step 210. Otherwise, method 200 may proceed again to step 204.

At step 210, management controller 106 may select a PSU 110 to act as the master of the current share bus. Such selection may be made in any suitable manner (e.g., based on one or more parameters associated with PSUs 110) and mechanisms for making such selection are beyond the scope of this disclosure.

At step 212, management controller 106 may (e.g., by communicating appropriate signals over the control bus indicated in FIG. 1) set the dedicated master variable DED_MASTER for the selected master to logic "1" and set the current share bus drive variable DRIVE for all PSUs 110 other than the selected master (i.e., the slave PSUs 110) to logic "0." Accordingly, at step 214, only the selected master PSU 110 may drive the current share bus, and all other PSUs 110 will follow the voltage $V_{share}$ driven on the current share bus in generating their own output currents.

At step 216, management controller 106 may determine if a fault condition exists in the master PSU 110. Such fault condition may include a loss of input source or any other condition compromising the ability of the master PSU 110 to generate an output current. If a fault condition exists in the master PSU 110, operation may proceed to a master fault mode, as described in greater detail below with respect to method 300. If no fault condition exists in master PSU 110, method 200 may proceed to step 218.

At step 218, one or more PSUs 110 may determine if a fault condition exists in management controller 106. Such fault condition may include any condition in which management controller 106 ceases operation or loses its ability to control PSUs 110 (e.g., a communication link between management controller 106 and PSUs 110 goes down). In some embodiments, such determination may be made by reading information communicated from management controller 106 indicative of its status (e.g., by communicating appropriate signals over the control bus indicated in FIG. 1). If a fault condition exists in the management controller 106, operation may proceed again to step 202. If no fault condition exists in management controller 106, method 200 may proceed again to step 214.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Figure 3:
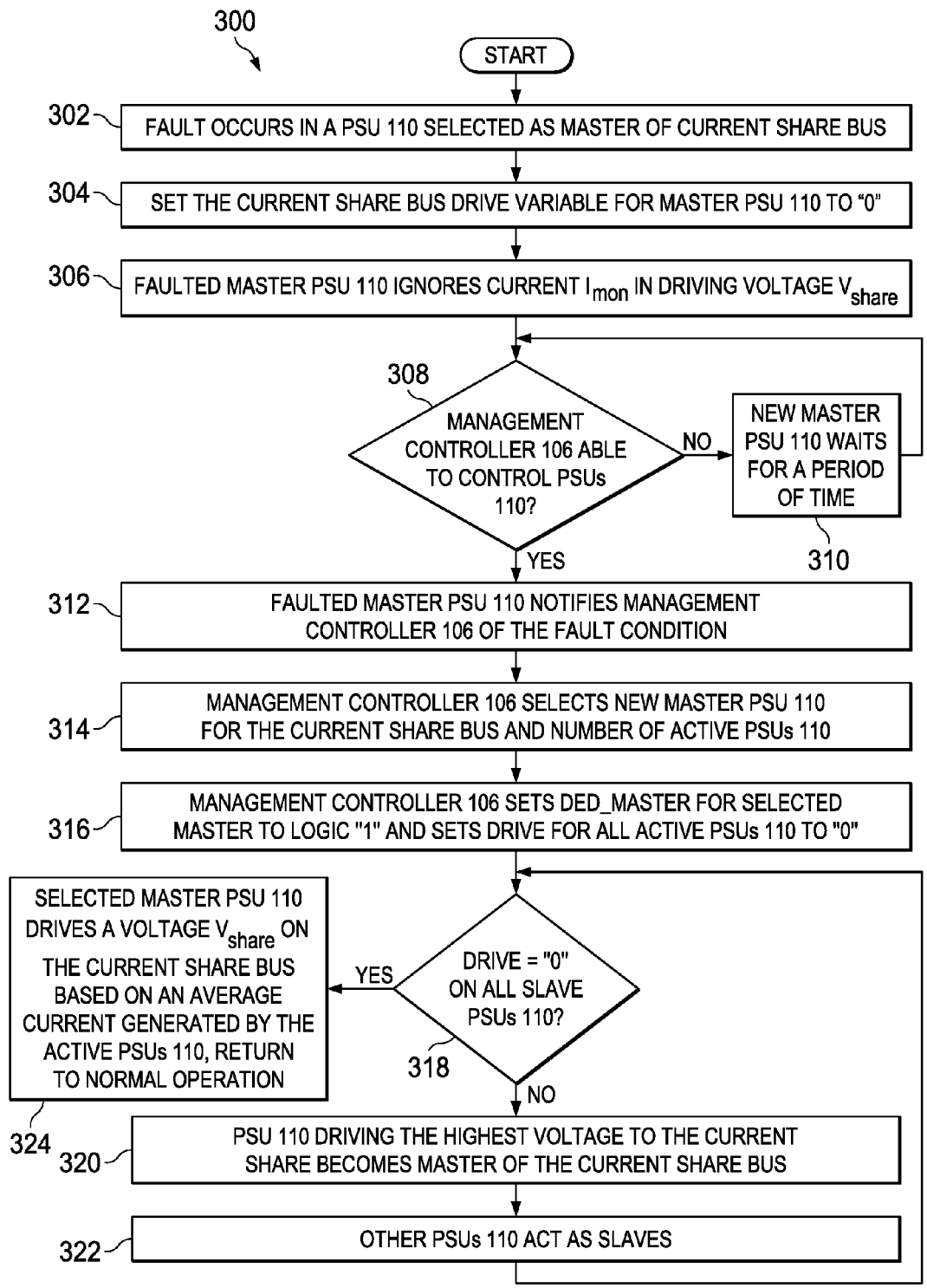
FIG. 3 illustrates a flow chart of an example method for current sharing in a master fault mode of a power system, in accordance with embodiments of the present disclosure.

FIG. 3 illustrates a flow chart of an example method 300 for current sharing in a master fault mode of a power system, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, a fault may occur in a PSU 110 selected (e.g., by management controller 106) as master of the current share bus. Such fault condition may include a loss of input source or any other condition compromising the ability of the master PSU 110 to generate an output current.

At step 304, in response to the fault in the master PSU 110, the master PSU 110 may set the current share bus drive variable DRIVE for the master PSU 110 to logic "0," thus disabling the master PSU 110 from driving the voltage share bus. At such point, all active PSUs 110 may be current share slave PSUs 110.

At step 306, the faulted master PSU 110 may ignore the monitored current $I_{mon}$ received by its master/slave gate 124, and thus, its computation of voltage $V_{share}$ may effectively not be driven to the $V_{share}$ bus. Accordingly, remaining PSUs 110 may compete to determine a new master PSU 110.

At step 308, the new master PSU 110 may determine if management controller 106 is able to control PSUs 110 (e.g., determine whether management controller 106 is in reset or not ready). Such determination may be made by reading information communicated from management controller 106 indicative of its status (e.g., by communicating appropriate signals over the control bus indicated in FIG. 1). If management controller 106 is able to control PSUs 110, method 300 may proceed to step 312. Otherwise, method 300 may proceed to step 310.

At step 310, in response to a determination that management controller 106 is unable to control PSUs 110 (e.g., management controller 106 is in reset or is not ready), master PSU 110 may wait for a period of time (e.g., 100 milliseconds) and proceed again to step 308.

At step 312, in response to a determination that management controller 106 is able to control PSUs 110, the faulted master PSU 110 may notify management controller 106 of the fault condition. Such notification may be made by communicating appropriate signals over the control bus indicated in FIG. 1.

At step 314, in response to the notification, management controller 106 may select a new master PSU 110 for the current share bus, and the number of active PSUs, and communicate a notification to each PSU 110.

At step 316, management controller 106 may set the dedicated master variable DED_MASTER for the selected master to logic "1" and set the current share bus drive variable DRIVE for all active PSUs 110 to logic "0," thus causing all active PSUs 110 other than the dedicated selected master PSU 110 to act as slave devices At step 318, management controller 106 may determine if current share bus drive variable DRIVE is logic "0" on all slave PSUs 110. If the current share bus drive variable DRIVE is logic "0" on all slave PSUs 110, then method 300 may proceed to step 324. Otherwise, method 300 may proceed to step 320.

At step 320, the PSU 110 driving the highest voltage to the current share bus may become the master of the current share bus. Accordingly, at step 322, all other PSUs 110 may act as slaves, and may attempt to "catch up" to the master by increasing their respective output currents. After completion of step 322, method 300 may proceed again to step 318.

At step 324, in response to current share bus drive variable DRIVE being logic "0" on all slave PSUs 110, the selected master PSU 110 may drive a voltage $V_{share}$ on the current share bus based on an average current generated by the active PSUs 110 (e.g., the aggregate current $I_{total}$ divided by the number of active PSUs 110). After completion of step 324, the power system may return to normal operation (e.g., as in step 214 of method 200).

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

Figure 4:
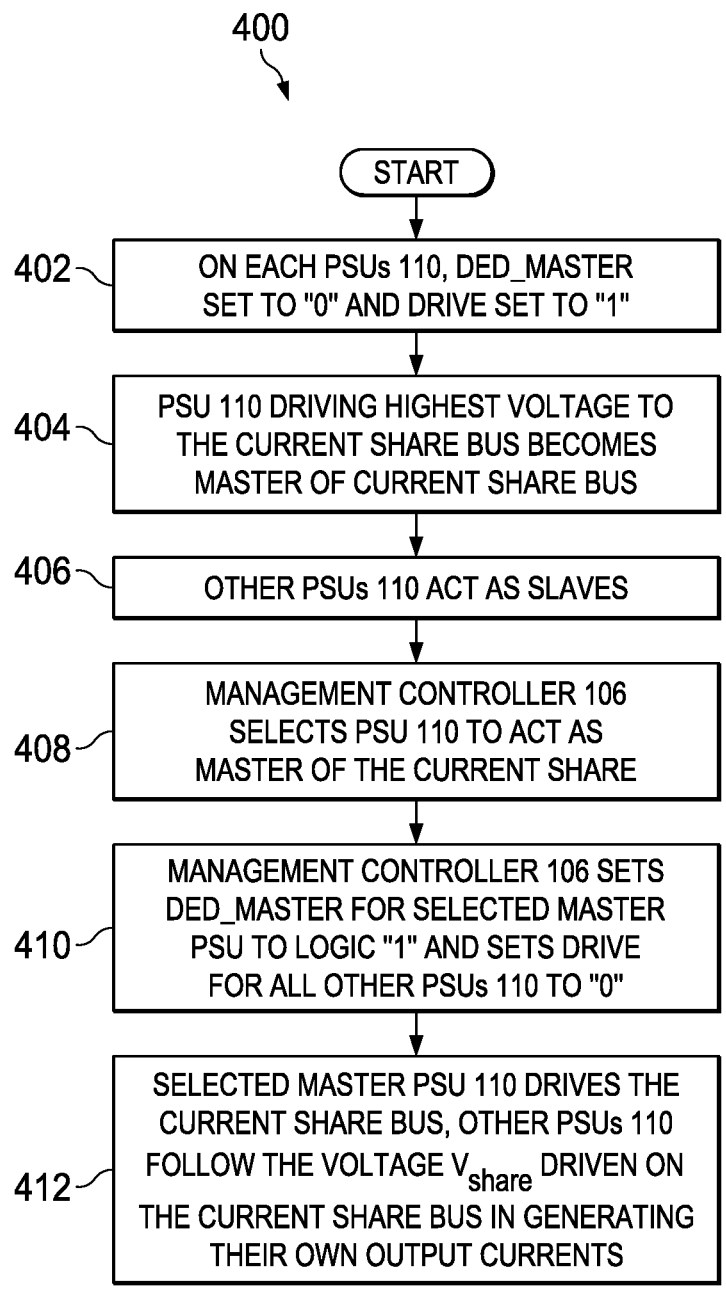
FIG. 4 illustrates a flow chart of an example method for current sharing in a swap mode of a power system, in accordance with embodiments of the present disclosure.

FIG. 4 illustrates a flow chart of an example method 400 for current sharing in a swap mode of a power system, in accordance with embodiments of the present disclosure. The swap mode may occur in response to a change in number of active PSUs, either due to a removal or an addition of a PSU 110. According to some embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, in response to a change in the number of active PSUs, management controller 106 may set control variable settings of active PSUs 110 such that their respective dedicated master variables DED_MASTER are set to logic "0" and their respective current share bus drive variables DRIVE are set to logic "1." With such default settings, each PSU 110 may drive or attempt to drive the current share bus and may attempt to become a master of the current share bus.

At step 404, the PSU 110 driving the highest voltage to the current share bus may become the master of the current share bus. Accordingly, at step 406, all other PSUs 110 may act as slaves, and may attempt to "catch up" to the master by increasing their respective output currents.

At step 408, based on the updated inventory of PSUs 110, management controller 106 may select a PSU 110 to act as the master of the current share bus. Such selection may be made in any suitable manner (e.g., based on one or more parameters associated with PSUs 110) and mechanisms for making such selection are beyond the scope of this disclosure.

At step 410, management controller 106 may (e.g., by communicating appropriate signals over the control bus indicated in FIG. 1) set the dedicated master variable DED_MASTER for the selected master to logic "1" and set the current share bus drive variable DRIVE for all PSUs 110 other than the selected master (i.e., the slave PSUs 110) to logic "0." Accordingly, at step 412, only the selected master PSU 110 may drive the current share bus, and all other PSUs 110 will follow the voltage $V_{share}$ driven on the current share bus in generating their own output currents.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a processor;
   a management controller communicatively coupled to the processor; and
   a plurality of power supply units communicatively coupled to the management controller for supplying electrical energy to one or more information handling resources of the information handling system via a power bus, each of the plurality of power supply units configured to:
     when the management controller is able to control the plurality of power supply units:
       receive an indication from the management controller whether such power supply unit is selected as a master of a current share bus;
       if such power supply unit is selected as the master, drive a current share signal on the current share bus, the current share signal indicative of an output current driven by such power supply unit on the power bus; and
       if such power supply unit is not selected as the master, monitor the current share signal and drive the output current to the power bus in accordance with the current share signal; and
     when the management controller is unable to control the plurality of power supply units:
       attempt to drive the current share signal on the current share bus; and
       monitor the current share signal and drive the output current to the power bus in accordance with the current share signal; and
   wherein when the management controller is unable to control the plurality of power supply units, a power supply unit of the plurality of power supply units driving a largest output current to the power bus drives the current share signal to the current share bus.

2. The information handling system of claim 1, wherein each power supply unit comprises:
   a current monitor configured to monitor the output current driven to the power bus by such power supply unit;
   a current aggregator configured to monitor an aggregate current output to the power bus by all of the plurality of power supply units; and
   a current share bus voltage computation block configured to calculate the current share signal driven by such power supply unit to the current share bus based on the output current driven to the power bus by such power supply unit and the aggregate current.

3. The information handling system of claim 1, wherein the management controller is further configured to, responsive to a fault of a particular power supply unit selected as the master, select another one of the plurality of power supply units as the master.

4. The information handling system of claim 1, wherein the management controller is further configured to, responsive to a change in a number of the plurality of power supply units, select a new master based on a configuration of the plurality of power supply units after the change.

5. A power supply unit comprising:
   a power train; and
   a controller communicatively coupled to the power train and configured to:
     receive an indication whether a management controller is able to control the power supply unit;
     when the indication indicates the management controller is able to control the power supply unit:
       receive an indication from the management controller whether the power supply unit is selected as a master of a current share bus;
       if the power supply unit is selected as the master, drive a current share signal on the current share bus, the current share signal indicative of an output current driven by the power train on a power bus; and
       if the power supply unit is not selected as the master, monitor the current share signal and drive the output current to the power bus in accordance with the current share signal; and
     when the indication indicates that the management controller is unable to control the power supply unit:
       attempt to drive the current share signal on the current share bus; and
       monitor the current share signal and drive the output current to the power bus in accordance with the current share signal; and
   wherein when the indication indicates that the management controller is unable to control the power supply unit, the controller is further configured to drive the current share signal to the current share bus when the power supply unit drives more current to the power bus than any other power supply unit coupled to the power bus and the current share bus.

6. The power supply unit of claim 5, wherein the controller comprises:
   a current monitor configured to monitor the output current driven by the power supply unit to the power bus;
   a current aggregator configured to monitor an aggregate current output to the power bus by the power supply unit and other power supply units coupled to the power bus; and a current share bus voltage computation block configured to calculate the current share signal driven by the controller to the current share bus based on the output current and the aggregate current.

7. The power supply unit of claim 5, wherein the controller is further configured to receive an indication of a selection of a new master responsive to a fault of another power supply unit coupled to the power bus and coupled to the current share bus and selected as the master.

8. The power supply unit of claim 5, wherein the controller is further configured to receive an indication of a selection of a new master responsive to a change in a number of other power supply units coupled to the power bus and coupled to the current share bus.

9. A method comprising:
  determining whether a management controller is able to control a plurality of power supply units;
  when the management controller is able to control the plurality of power supply units:
    selecting a power supply unit of the plurality of power supply units as a master of a current share bus;
    driving, by the power supply unit selected as the master, a current share signal on the current share bus, the current share signal indicative of an output current driven by the power supply unit selected as the master; and
    monitoring, by power supply units other than the power supply unit selected as the master, the current share signal and driving, by power supply units other than the power supply unit selected as the master, respective output currents to the power bus in accordance with the current share signal; and
  when the management controller is unable to control the plurality of power supply units:
    attempting, by each of the plurality of power supply units, to drive the current share signal on the current share bus; and
    monitoring, by each of the power supply units, the current share signal and driving, by each of the power supply units, the output current to the power bus in accordance with the current share signal; and
  wherein when the management controller is unable to control the plurality of power supply units, driving, by a power supply unit of the plurality of power supply units driving a largest output current to the power bus, the current share signal to the current share bus.

10. The method of claim 9, further comprising, for each power supply unit:
  monitoring the output current driven by such power supply unit to the power bus;
  monitoring an aggregate current output to the power bus by all of the plurality of power supply units; and
  calculating the current share signal driven by such power supply unit to the current share bus based on the output current driven by such power supply unit and the aggregate current.

11. The method of claim 9, further comprising, responsive to a fault of a particular power supply unit selected as the master, selecting another one of the plurality of power supply units as the master.

12. The method of claim 9, further comprising, responsive to a change in a number of the plurality of power supply units, selecting a new master based on a configuration of the plurality of power supply units after the change.

13. An information handling system comprising:
  a processor;
  a management controller communicatively coupled to the processor; and
  a plurality of power supply units communicatively coupled to the management controller for supplying electrical energy to one or more information handling resources of the information handling system via a power bus, each of the plurality of power supply units configured to:
    when the management controller is able to control the plurality of power supply units:
      receive an indication from the management controller whether such power supply unit is selected as a master of a current share bus;
      if such power supply unit is selected as the master, drive a current share signal on the current share bus, the current share signal indicative of an output current driven by such power supply unit on the power bus; and
      if such power supply unit is not selected as the master, monitor the current share signal and drive the output current to the power bus in accordance with the current share signal;
    when the management controller is unable to control the plurality of power supply units:
      attempt to drive the current share signal on the current share bus; and
      monitor the current share signal and drive the output current to the power bus in accordance with the current share signal; and
  wherein each power supply unit comprises:
    a current monitor configured to monitor the output current driven to the power bus by such power supply unit;
    a current aggregator configured to monitor an aggregate current output to the power bus by all of the plurality of power supply units; and
    a current share bus voltage computation block configured to calculate the current share signal driven by such power supply unit to the current share bus based on the output current driven to the power bus by such power supply unit and the aggregate current.

14. The information handling system of claim 13, wherein the management controller is further configured to, responsive to a fault of a particular power supply unit selected as the master, select another one of the plurality of power supply units as the master.

15. The information handling system of claim 13, wherein the management controller is further configured to, responsive to a change in a number of the plurality of power supply units, select a new master based on a configuration of the plurality of power supply units after the change.

16. A power supply unit comprising:
  a power train; and
  a controller communicatively coupled to the power train and configured to:
    receive an indication whether a management controller is able to control the power supply unit;
    when the indication indicates the management controller is able to control the power supply unit:
      receive an indication from the management controller whether the power supply unit is selected as a master of a current share bus;
      if the power supply unit is selected as the master, drive a current share signal on the current share bus, the current share signal indicative of an output current driven by the power train on a power bus; and if the power supply unit is not selected as the master, monitor the current share signal and drive the output current to the power bus in accordance with the current share signal;

when the indication indicates that the management controller is unable to control the power supply unit:

attempt to drive the current share signal on the current share bus; and monitor the current share signal and drive the output current to the power bus in accordance with the current share signal; and wherein the controller comprises:

a current monitor configured to monitor the output current driven by the power supply unit to the power bus;

a current aggregator configured to monitor an aggregate current output to the power bus by the power supply unit and other power supply units coupled to the power bus; and a current share bus voltage computation block configured to calculate the current share signal driven by the controller to the current share bus based on the output current and the aggregate current.

17. The power supply unit of claim 16, wherein the controller is further configured to receive an indication of a selection of a new master responsive to a fault of another power supply unit coupled to the power bus and coupled to the current share bus and selected as the master.

18. The power supply unit of claim 16, wherein the controller is further configured to receive an indication of a selection of a new master responsive to a change in a number of other power supply units coupled to the power bus and coupled to the current share bus.

19. A method comprising:

determining whether a management controller is able to control a plurality of power supply units;

when the management controller is able to control the plurality of power supply units:

selecting a power supply unit of the plurality of power supply units as a master of a current share bus;

driving, by the power supply unit selected as the master, a current share signal on the current share bus, the current share signal indicative of an output current driven by the power supply unit selected as the master; and monitoring, by power supply units other than the power supply unit selected as the master, the current share signal and driving, by power supply units other than the power supply unit selected as the master, respective output currents to the power bus in accordance with the current share signal;

when the management controller is unable to control the plurality of power supply units:

attempting, by each of the plurality of power supply units, to drive the current share signal on the current share bus; and monitoring, by each of the power supply units, the current share signal and driving, by each of the power supply units, the output current to the power bus in accordance with the current share signal; and for each power supply unit:

monitoring the output current driven by such power supply unit to the power bus;

monitoring an aggregate current output to the power bus by all of the plurality of power supply units; and calculating the current share signal driven by such power supply unit to the current share bus based on the output current driven by such power supply unit and the aggregate current.

20. The method of claim 19, further comprising, responsive to a fault of a particular power supply unit selected as the master, selecting another one of the plurality of power supply units as the master.

21. The method of claim 19, further comprising, responsive to a change in a number of the plurality of power supply units, selecting a new master based on a configuration of the plurality of power supply units after the change.

22. An information handling system comprising:

a processor;

a management controller communicatively coupled to the processor; and a plurality of power supply units communicatively coupled to the management controller for supplying electrical energy to one or more information handling resources of the information handling system via a power bus, each of the plurality of power supply units configured to:

when the management controller is able to control the plurality of power supply units:

receive an indication from the management controller whether such power supply unit is selected as a master of a current share bus;

if such power supply unit is selected as the master, drive a current share signal on the current share bus, the current share signal indicative of an output current driven by such power supply unit on the power bus; and if such power supply unit is not selected as the master, monitor the current share signal and drive the output current to the power bus in accordance with the current share signal; and when the management controller is unable to control the plurality of power supply units:

attempt to drive the current share signal on the current share bus; and monitor the current share signal and drive the output current to the power bus in accordance with the current share signal;

wherein the management controller is configured to, responsive to a change in a number of the plurality of power supply units, select a new master based on a configuration of the plurality of power supply units after the change.

23. The information handling system of claim 22, wherein the management controller is further configured to, responsive to a fault of a particular power supply unit selected as the master, select another one of the plurality of power supply units as the master.

24. A power supply unit comprising:

a power train; and a controller communicatively coupled to the power train and configured to:

receive an indication whether a management controller is able to control the power supply unit;

when the indication indicates the management controller is able to control the power supply unit:

receive an indication from the management controller whether the power supply unit is selected as a master of a current share bus;

if the power supply unit is selected as the master, drive a current share signal on the current share bus, the current share signal indicative of an output current driven by the power train on a power bus; and if the power supply unit is not selected as the master, monitor the current share signal and drive the output current to the power bus in accordance with the current share signal;

when the indication indicates that the management controller is unable to control the power supply unit:
attempt to drive the current share signal on the current share bus; and
monitor the current share signal and drive the output current to the power bus in accordance with the current share signal; and wherein the controller is further configured to receive an indication of a selection of a new master responsive to a change in a number of other power supply units coupled to the power bus and coupled to the current share bus.

25. The power supply unit of claim 24, wherein the controller is further configured to receive an indication of a selection of a new master responsive to a fault of another power supply unit coupled to the power bus and coupled to the current share bus and selected as the master.

26. A method comprising:
determining whether a management controller is able to control a plurality of power supply units;
when the management controller is able to control the plurality of power supply units:
selecting a power supply unit of the plurality of power supply units as a master of a current share bus;
driving, by the power supply unit selected as the master, a current share signal on the current share bus, the current share signal indicative of an output current driven by the power supply unit selected as the master; and
monitoring, by power supply units other than the power supply unit selected as the master, the current share signal and driving, by power supply units other than the power supply unit selected as the master, respective output currents to the power bus in accordance with the current share signal;

when the management controller is unable to control the plurality of power supply units:
attempting, by each of the plurality of power supply units, to drive the current share signal on the current share bus; and
monitoring, by each of the power supply units, the current share signal and driving, by each of the power supply units, the output current to the power bus in accordance with the current share signal; and responsive to a change in a number of the plurality of power supply units, selecting a new master based on a configuration of the plurality of power supply units after the change.

27. The method of claim 26, further comprising, responsive to a fault of a particular power supply unit selected as the master, selecting another one of the plurality of power supply units as the master.

* * * * *